US006361012B1

(12) United States Patent
Chang

(10) Patent No.: US 6,361,012 B1
(45) Date of Patent: Mar. 26, 2002

(54) TELEVISION STAND FOR A VEHICLE

(75) Inventor: Lung-Wen Chang, Chung Ho (TW)

(73) Assignee: Punch Video Inc., Chung (TW)

( * ) Notice: Subject to any disclaimer, the term of this patent is extended or adjusted under 35 U.S.C. 154(b) by 0 days.

(21) Appl. No.: 09/610,245

(22) Filed: Jul. 6, 2000

(51) Int. Cl.$^7$ ................................................. A47H 1/10
(52) U.S. Cl. ................. 248/324; 248/278.1; 248/299.1; 224/311; 296/37.8
(58) Field of Search ........................... 248/176.3, 179.1, 248/183.2, 278.1, 292.13, 299.1, 323, 324, 919; 296/37.7, 37.8; 224/311

(56) References Cited

U.S. PATENT DOCUMENTS 2,614,861 A * 10/1952 Van Horn
5,139,223 A * 8/1992 Sedighzadeh
5,201,896 A * 4/1993 Kruszewski
6,125,030 A * 9/2000 Mola et al.
6,157,418 A * 12/2000 Rosen
6,186,459 B1 * 2/2001 Ma

* cited by examiner

Primary Examiner—Anita King
Assistant Examiner—Korie H. Chan
(74) Attorney, Agent, or Firm—Wolf, Greenfield & Sacks, P.C.; James H. Morris

(57) ABSTRACT

A television stand has a base, a pivotal hinge extension formed on one end of the base and having a cavity defined therein, an extension formed in the base and laterally extending into the cavity, a pivot plate rotatably mounted on the extension with a vertical axis of rotation and a frame pivotally connected to the pivot plate with a lateral axis of rotation. Consequently, the frame can be folded into the base when the television mounted in the frame is not in use. In addition, the frame can be longitudinally rotated relative to the base to adjust the operation angle. The facility and versatility of using the television stand can be improved.

6 Claims, 7 Drawing Sheets

TELEVISION STAND FOR A VEHICLE

BACKGROUND OF THE INVENTION

1. Field of the Invention

The present invention relates to a television stand, and more particularly to a foldable and rotatable television stand for a vehicle.

2. Description of Related Art

A television is mounted in a van to increase passenger enjoyment during a journey. The conventional stand for a television comprises a hollow frame securely attached to the ceiling of a van. However, because the conventional television stand is attached to the ceiling of the van, the conventional television stand will reduce the internal space available in the van. The convenience of getting in or out of the van will be reduced.

In addition, because the conventional television stand is securely mounted in the van, the television mounted in the conventional stand cannot rotate to accommodate the position of the viewer.

To overcome the shortcomings, the present invention tends to provide an improved television stand to mitigate or obviate the aforementioned problems.

SUMMARY OF THE INVENTION

The main objective of the invention is to provide an improved television stand having a base, a pivotal hinge extension, an extension, a pivot plate and a frame. The pivotal hinge extension integrally formed on the base and having a cavity defined therein. The extension is integrally formed on the base and extends laterally into the cavity. The pivot plate is pivotally mounted on the extension with a longitudinal axle. The frame receives the television and is pivotally connected to the pivot plate with a lateral axis. By such an arrangement, the frame can be rotated parallel with the roof of the van when the television mounted in the frame is not in use. This improves the convenience of the television stand when the television is being used and when it is stored.

The other objective of the invention is to provide an improved television stand. Because the frame is pivotally mounted on the base with a longitudinal axis, the frame can be longitudinally rotated relative to the base. Consequently, the television stand is much more versatile.

Other objects, advantages and novel features of the invention will become more apparent from the following detailed description when taken in conjunction with the accompanying drawings.

DETAILED DESCRIPTION OF PREFERRED EMBODIMENT

Figure 1:
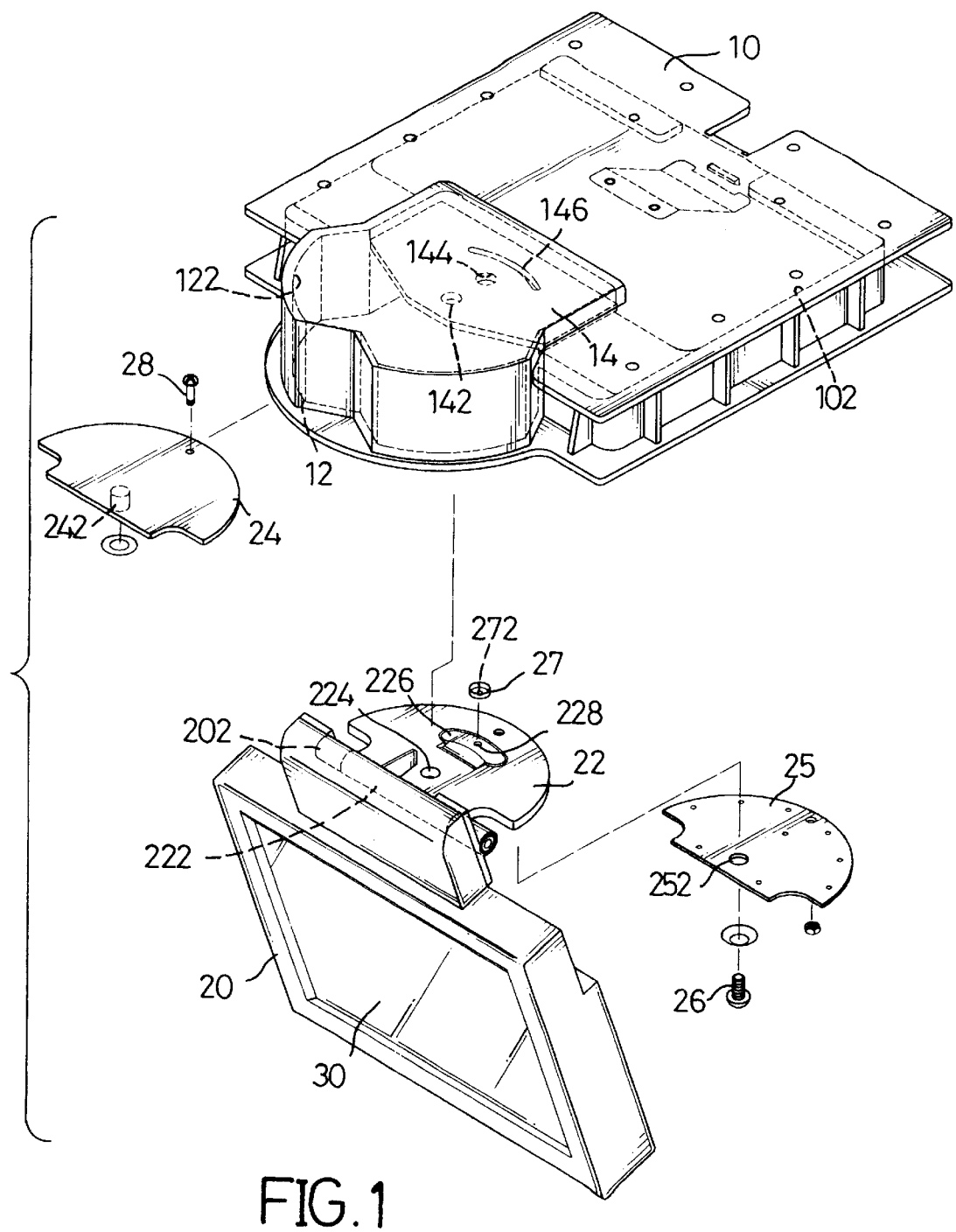
FIG. 1 is an exploded perspective view of a television stand in accordance with the present invention
Figure 2:
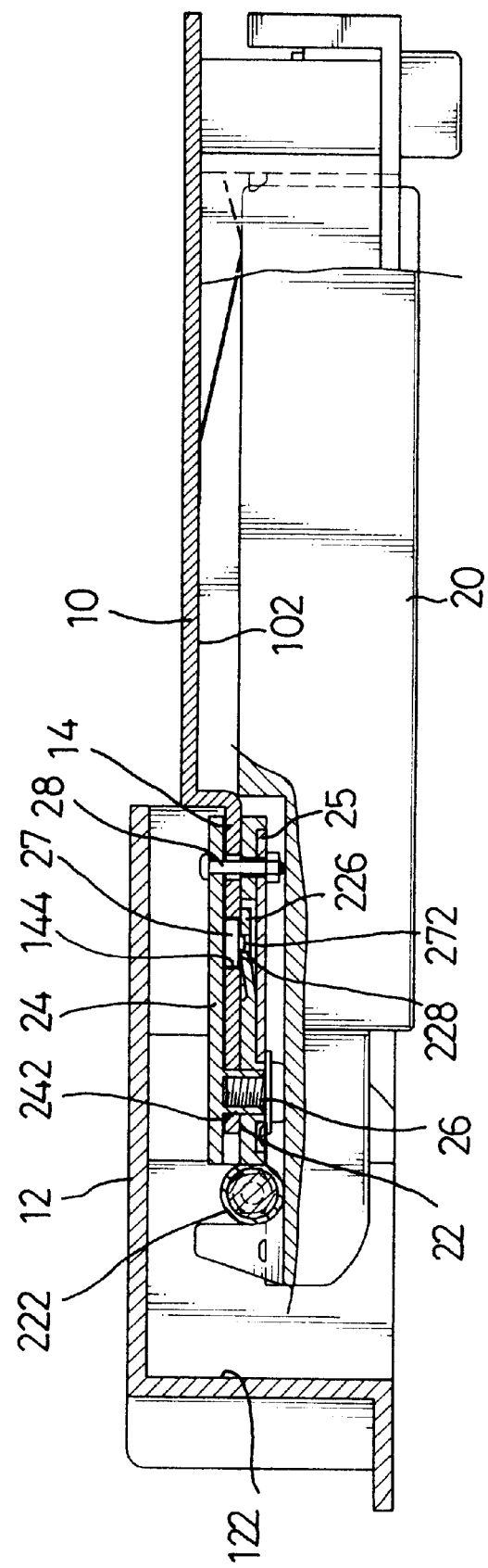
FIG. 2 is a side plan view in partial section of the television stand in FIG. 1 with the frame stored in the base.

With reference to FIGS. 1 and 2, a television stand in accordance with the present invention comprises a base (10) and a frame (20) pivotally connected to the base (10). The base (10) can be attached to the ceiling of a vehicle like a van. A recess (102) is defined in the bottom of the base (10) to receive the frame (20). A pivotal hinge extension (12) is formed on one end of the base (10) and has a substantially Y-shaped cavity (122) defined in the bottom. The cavity (122) is open to the recess (102), and an extension (14) formed on the base (10) extends into the cavity (122).

A flat screen television (30) is secured in the frame (20). A pivot plate (22) is pivotally connected to the frame (20) with a lateral axis of rotation. Segments of a hinge tube (202,222) are formed on both the frame (20) and the pivot plate (22), and a pivot pin extends through the hinge tube (202,222) segments so the frame (20) is pivotally connected to the pivot plate (22). An upper plate (24) and a lower plate (25) squeeze the extension (14) and the pivot plate (22). A sleeve (242) with an internal threaded hole extends downward from the bottom of the upper plate (24) and through the extension (14), the pivot plate (22) and the lower plate (25). The sleeve (242) extends through aligned holes (142,224, 252) defined in the extension (14), pivot plate (22) and lower plate (25), respectively. A bolt (26) screws into the sleeve (242), such that the pivot plate (22) can be pivotally connected to the extension (14) with a vertical axis of rotation. Consequently, the frame (20) is pivotally connected to the base (10) with two perpendicular axes of rotation.

Figure 3:
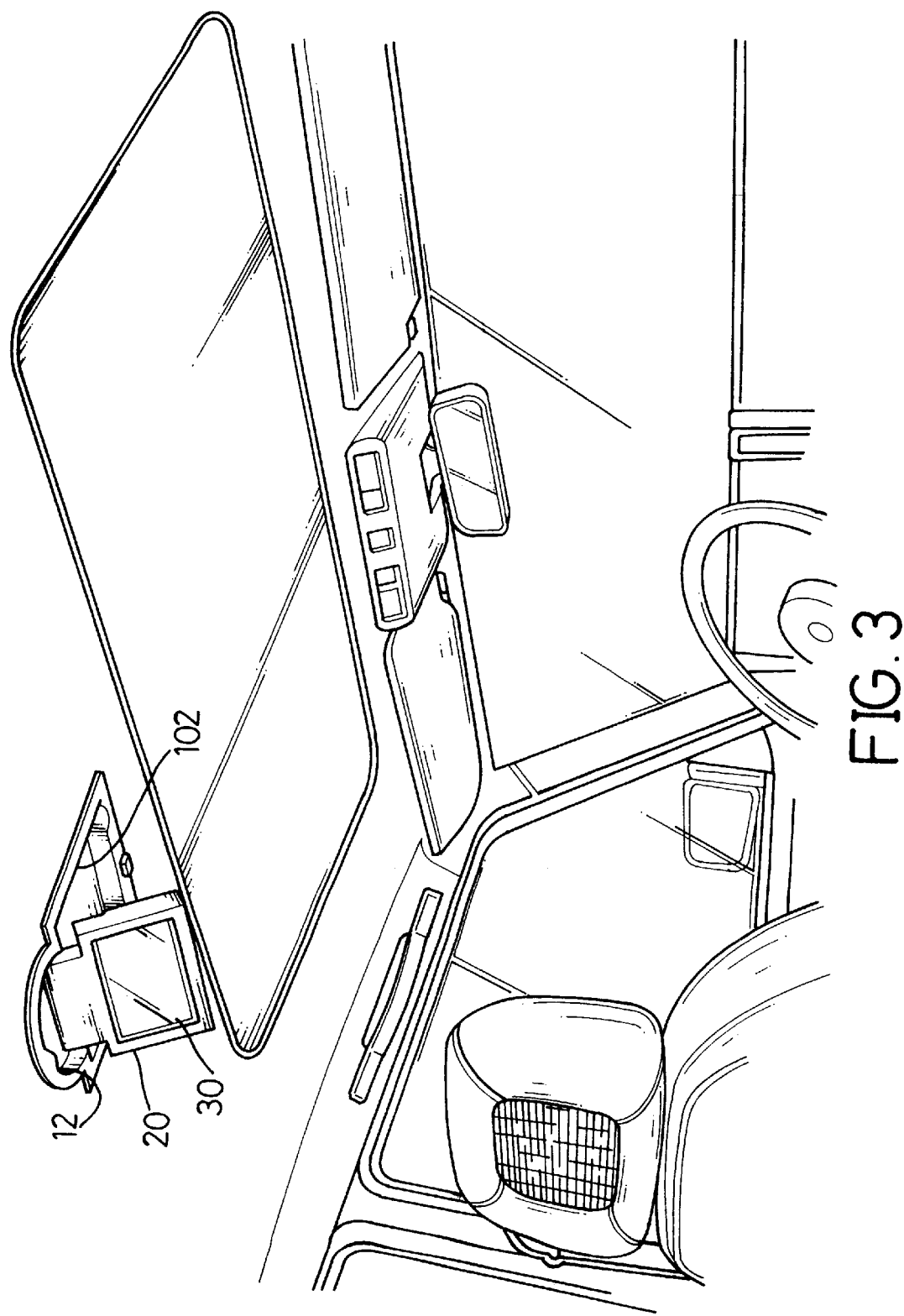
FIG. 3 is an operational perspective view of the television stand in FIG. 1 attached to the ceiling of a van.
Figure 4:
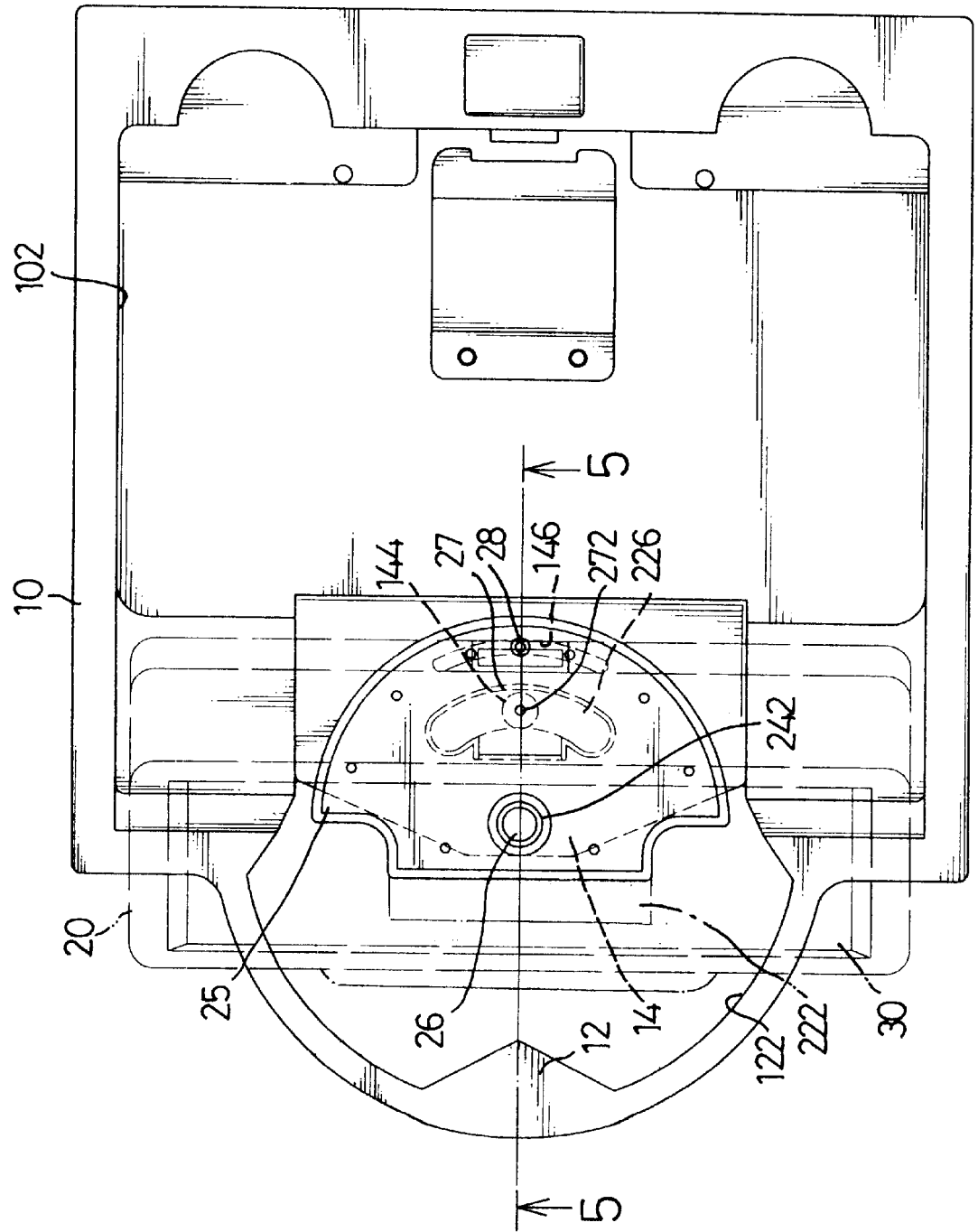
FIG. 4 is a bottom plan view of the base in FIG. 1.
Figure 5:
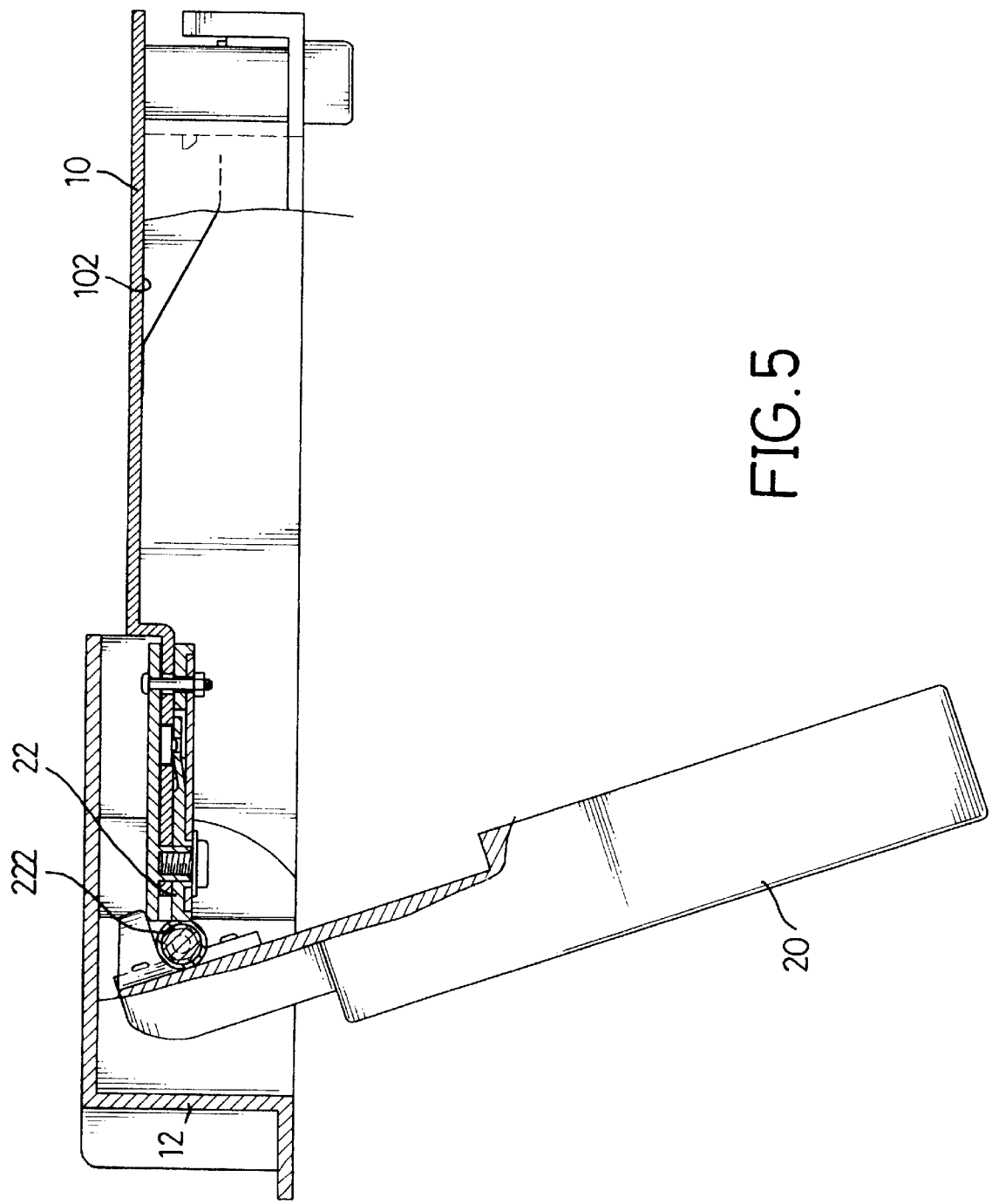
FIG. 5 is an operational side plan view in partial section of the television stand in FIG. 1 with the frame in a position for viewing.

With reference to FIGS. 3 to 5, the base (10) is inlaid into the ceiling of a van. If a passenger wants to watch the TV (30), he or she pivots the frame (20) down relative to the base (10) on the lateral axis. The frame (20) can be adjusted to a desired angle to face the viewer sitting in the rear seat, such that the viewer can watch the TV (30) mounted in the frame (20). When the user does not want to watch the TV (30). He or she rotates the frame (20) into the recess (102) of the base (10), as shown in FIG. 2, so that the television stand is folded into the ceiling. This keeps the passengers from bumping the stand when they get in or out of the van. The convenience of using the television stand is improved.

Figure 6:
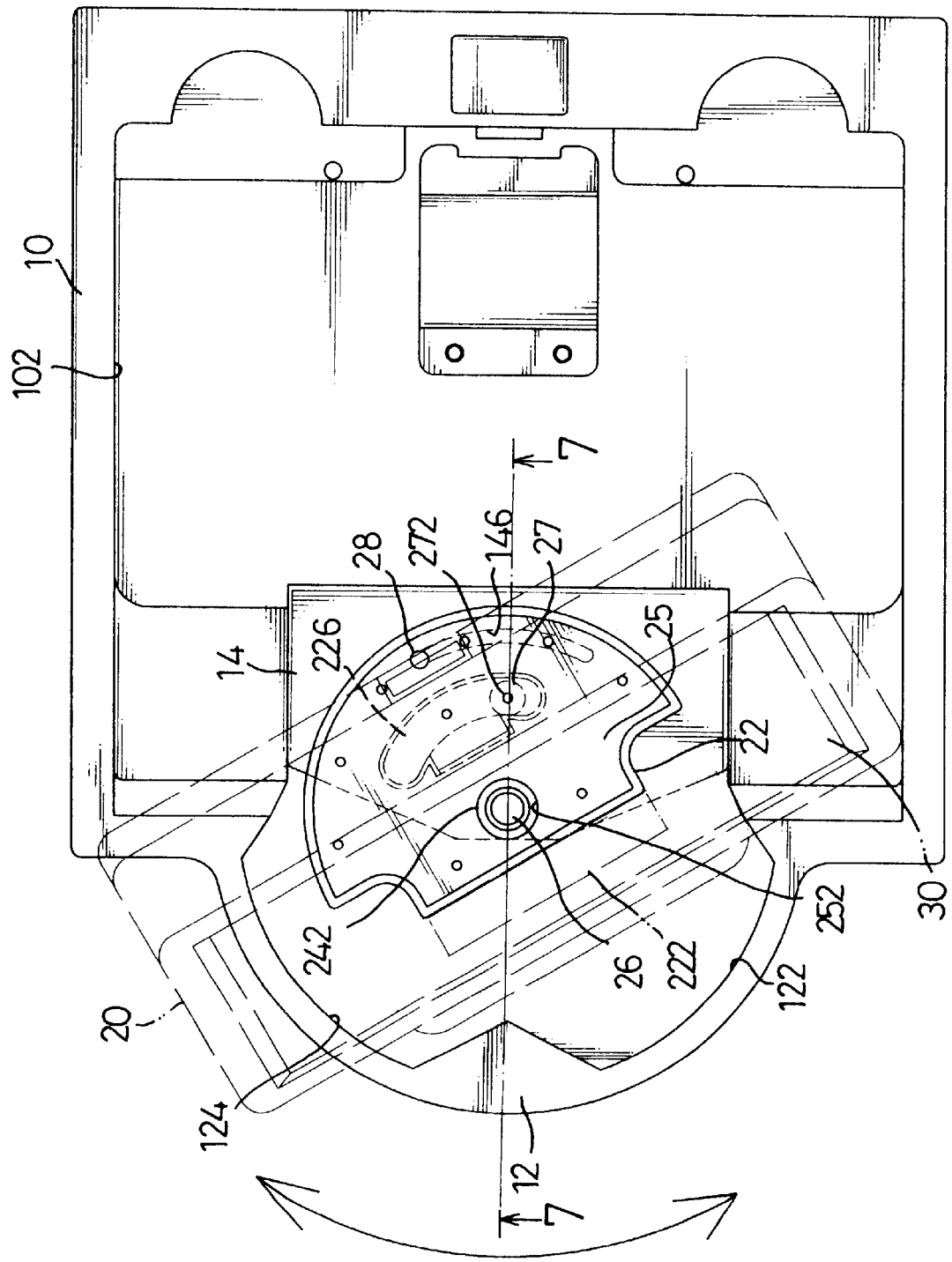
FIG. 6 is a bottom plan view of the base in FIG. 1 with the frame rotated relative to the base to change the angle of the frame.
Figure 7:
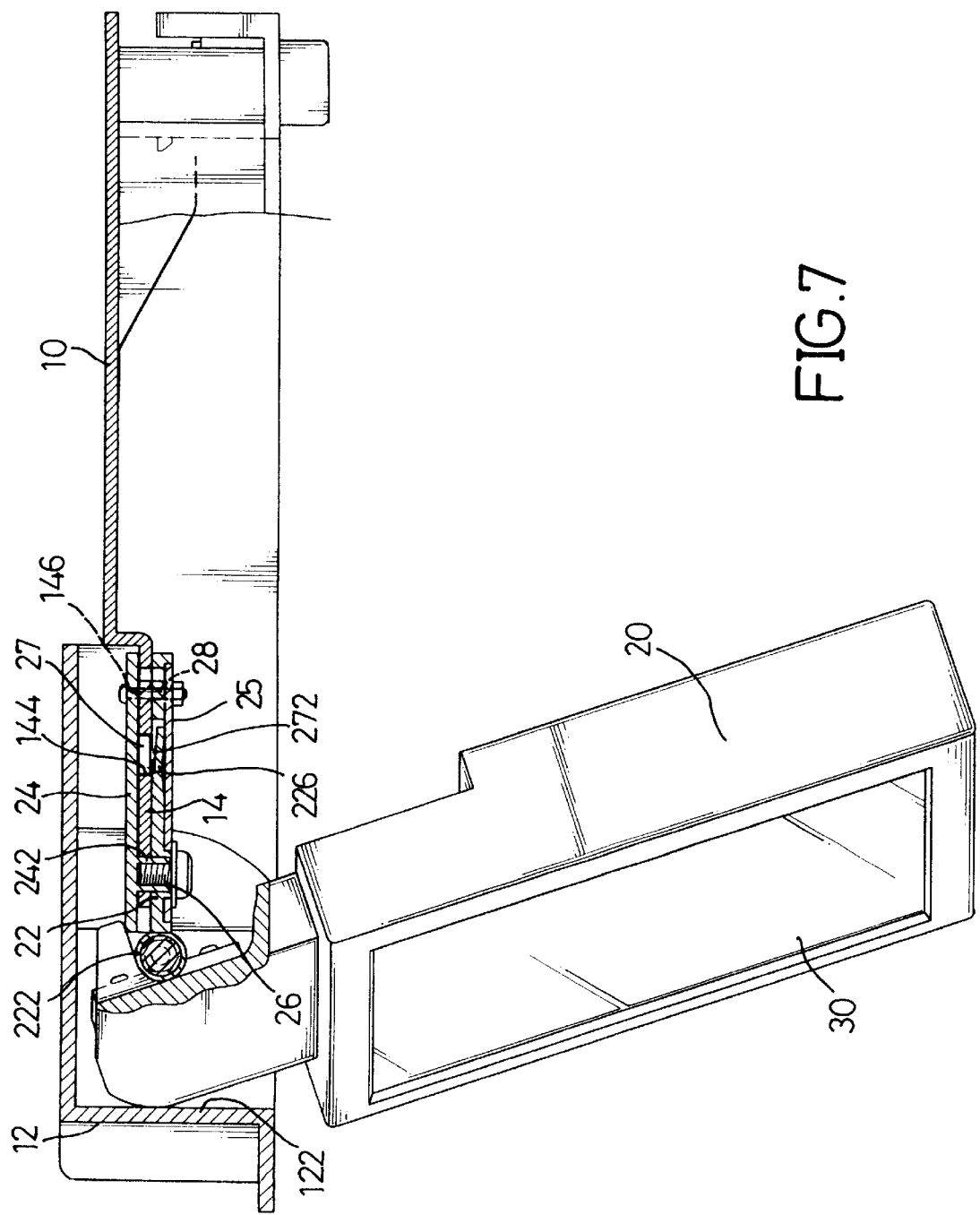
FIG. 7 is an operational combination side plan and perspective view in partial section of the television stand in FIG. 1 with the frame rotated relative to the base.

With reference to FIGS. 6 and 7, because the frame (20) is pivotally connected to the base (10) with a longitudinal axis, the frame (20) rotated left or right relative to the base (10) to adjust the direction. Consequently, the TV (30) can be adjusted to face a viewer sitting near the door of the van. The angle of the frame (20) is limited by the inner wall of the cavity (122). This improves the versatility of using the television stand.

With reference to FIGS. 1 and 4–7, a curved groove (146) is defined in the extension (14) with the hole (142) as the center of curvature. A pin (28) extends through the upper plate (24), curved groove (146), pivot plate (22) and lower plate (25) and screws into a nut. When the frame (20) rotates laterally relative to the base (10) with the sleeve (242) as a pivot, the pin (28) will slide along the curved groove (146), and the rotation angle of the frame (20) will be limited by the curved groove (146).

Furthermore, a resilient strip (226) is formed on the pivot plate (22), and a bore (228) is defined at the middle point of the strip (226). An aperture (144) is defined in the extension (14) and aligns with the bore (228) on the pivot plate (226). A positioning block (27) made of rubber material is received in the aperture (144) and abuts the strip (226). A nub (272) protrudes from the bottom of the block (27) and extends into the bore (228), such that the initial point of the frame (20) will be held in position by the engagement between the nub (272) and bore (228).

When the frame (20) is rotated relative to the base (10), the positioning block (27) will press against the resilient strip (226), such that the block (27) will tightly abut the strip (226) to provide a holding effect on the pivot plate (22). The frame (20) will be securely positioned in any desired angle due to the damping effect provided by the block (27).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A television stand comprising:

a base having a recess defined therein;

a pivotal hinge extension formed on one end of the base and having a cavity defined in the pivotal hinge extension;

an extension formed in the base and extending laterally into the pivotal hinge extension cavity;

a pivot plate pivotally mounted on a pivotal hinge extension with a vertical axis of rotation; and a frame pivotally connected to the pivot plate with a lateral axis of rotation to support the television, and the frame being receivable in the recess of the base.

2. The television stand as claimed in claim 1, wherein the cavity is substantially Y-shaped.

3. The television stand as claimed in claim 1 further comprising an upper plate and a lower plate for the extension and the pivot plate being squeezed between the upper and lower plate to pivotally mount the pivot plate with the extension.

4. The television stand as claimed in claim 3, wherein a sleeve with an internal threaded hole extends downward from the upper plate through the extension, the pivot plate and the lower plate; and a bolt screws into the sleeve, thereby the pivot plate can be pivotally mounted on the extension.

5. The television stand as claimed in claim 3, wherein a curved groove is defined in the extension;

a pin extends through the upper plate, the curved groove on the extension, the pivot plate and the lower plate; and a nut screws onto the pin to mount the pin between the upper plate and lower plate.

6. The television stand as claimed in claim 1, wherein a resilient strip is formed on the pivot plate;

a bore is defined in the resilient strip;

an aperture is defined in the extension and aligns with the bore on the resilient strip;

a positioning block is received in the aperture; and a nub extends downward from the positioning block into the bore.

* * * * *